(12) United States Patent
Ogino

(10) Patent No.: US 9,947,970 B2
(45) Date of Patent: Apr. 17, 2018

(54) METHOD FOR MANUFACTURING AND OPERATING POWER STORAGE DEVICE

(75) Inventor: Kiyofumi Ogino, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 421 days.

(21) Appl. No.: 13/427,134

(22) Filed: Mar. 22, 2012

(65) Prior Publication Data

US 2012/0242292 A1 Sep. 27, 2012

(30) Foreign Application Priority Data

Mar. 25, 2011 (JP) ................................ 2011-068585
May 27, 2011 (JP) ................................ 2011-118807

(51) Int. Cl.
| | |
|---|---|
| *H02J 7/00* | (2006.01) |
| *H01M 10/44* | (2006.01) |
| *H01M 10/052* | (2010.01) |
| *H01M 10/0562* | (2010.01) |
| *H01M 10/0585* | (2010.01) |

(52) U.S. Cl.
CPC ........ *H01M 10/443* (2013.01); *H01M 10/052* (2013.01); *H01M 10/0562* (2013.01); *H01M 10/0585* (2013.01); *H02J 7/0075* (2013.01); H01M 2300/0065 (2013.01); H01M 2300/0091 (2013.01); Y02T 10/7011 (2013.01); Y10T 29/49108 (2015.01)

(58) Field of Classification Search
CPC ................................................. H01M 10/0565
USPC .......................... 320/128; 429/408, 409, 465
See application file for complete search history.

(56) References Cited

U.S. PATENT DOCUMENTS 6,001,509 A    12/1999  Kim et al.
6,190,805 B1 *  2/2001  Takeuchi ................ C07C 69/96
                                                              361/525

(Continued)

FOREIGN PATENT DOCUMENTS

EP    1005099 A    5/2000
EP    1139460 A   10/2001

(Continued)

OTHER PUBLICATIONS

F. Croce et al.; "Nanocomposite polymer electrolytes for lithium batteries"; NATURE; Jul. 30, 1998; pp. 456-458; vol. 394.

(Continued)

*Primary Examiner* — Drew A Dunn
*Assistant Examiner* — Zixuan Zhou
(74) *Attorney, Agent, or Firm* — Fish & Richardson P.C.

(57) ABSTRACT

A power storage device including a solid electrolyte and operating at room temperature and a power storage device including a solid electrolyte and having higher discharge capacity are manufactured. The power storage devices are each manufactured in the following manner: an electrolyte including an ion-conducting high polymer, an inorganic oxide, and a lithium electrolyte salt is provided between a positive electrode and a negative electrode; charge at a first current value is performed and then a charge at a first voltage value obtained by the charge at the first current value is performed, between the positive electrode and the negative electrode at room temperature; and discharge at a second current value is performed after the charge at the first voltage value is performed.

16 Claims, 15 Drawing Sheets

(56) References Cited

U.S. PATENT DOCUMENTS

| | | | |
|---|---|---|---|
| 6,268,088 B1 | 7/2001 | Oh et al. | |
| 6,395,428 B1 | 5/2002 | Kezuka | |
| 6,548,208 B1* | 4/2003 | Kasamatsu et al. | 429/218.1 |
| 6,677,083 B2 | 1/2004 | Suzuki et al. | |
| 2002/0076605 A1* | 6/2002 | Akashi | H01M 4/13 429/60 |
| 2004/0005504 A1* | 1/2004 | Kugai | H01B 1/10 429/322 |
| 2004/0151986 A1* | 8/2004 | Park | C03C 3/14 429/322 |
| 2004/0191629 A1* | 9/2004 | Itaya | H01M 4/0402 429/231.95 |
| 2004/0234865 A1 | 11/2004 | Sato et al. | |
| 2005/0153189 A1* | 7/2005 | Okamoto | H01M 8/1246 429/496 |
| 2008/0241693 A1* | 10/2008 | Fukuchi | C01G 45/006 429/231.1 |
| 2008/0268346 A1 | 10/2008 | Inda | |
| 2012/0148924 A1 | 6/2012 | Ogino et al. | |

FOREIGN PATENT DOCUMENTS

| | | | |
|---|---|---|---|
| EP | 1471591 A | 10/2004 | |
| EP | 2418713 A | 2/2012 | |
| JP | 10-247417 A | 9/1998 | |
| JP | 10-324719 A | 12/1998 | |
| JP | 2000-003731 A | 1/2000 | |
| JP | 2000-164254 A | 6/2000 | |
| JP | 2001-283917 A | 10/2001 | |
| JP | 2002-033131 A | 1/2002 | |
| JP | 2002-280072 A | 9/2002 | |
| JP | 2002-280072 A | 9/2002 | |
| JP | 2004-342318 A | 12/2004 | |
| JP | 2005-011595 A | 1/2005 | |
| JP | 2006-040853 A | 2/2006 | |
| JP | 2006-252882 A | 9/2006 | |
| JP | 2008-291046 A | 12/2008 | |
| JP | 2008-291046 A | 12/2008 | |
| JP | 2010-250968 A | 11/2010 | |

OTHER PUBLICATIONS

Ogiwara.Y et al., "Formation of amorphous LiCl aggregate regions in LiCll-Li2O-P2O5 fast ion conducting glasses studied by ac conductometry and 7Li MAS NMR", J. Non-Cryst. Solids (Journal of Non-Crystalline Solids), Sep. 1, 2006, vol. 352, Issue 42-49, pp. 5192-5198, Elsevier.

Prasada Rao.R et al., "Molecular dynamics simulation of ternary glasses Li2O-P2O5-LiCl", Solid State Communications, Jul. 10, 2004, vol. 131, Issue. 8, pp. 537-542.

* cited by examiner

METHOD FOR MANUFACTURING AND OPERATING POWER STORAGE DEVICE

BACKGROUND OF THE INVENTION

1. Field of the Invention

One embodiment of the disclosed invention relates to a method for manufacturing a power storage device and a method for operating a power storage device.

Note that the power storage device refers to all elements and devices which have a function of storing power.

2. Description of the Related Art

In recent years, the development of power storage devices such as a lithium-ion secondary battery and a lithium-ion capacitor has been conducted.

In addition, for power storage devices using solid electrolytes, the use of a high molecular compound having high ionic conductivity in which lithium salt is dissolved in polyethylene oxide, for an electrolyte, has been studied.

A power storage device has been proposed, in which mesoporous fillers made of metal oxide are provided as ion-conduction paths between electrodes and a space between the mesoporous fillers is filled with a high molecular compound with high ionic conductivity in order to further increase the ionic conductivity of such a high molecular compound having high ionic conductivity (e.g., Patent Document 1).

REFERENCE

[Patent Document 1] Japanese Published Patent Application No. 2006-40853

Although provision of the mesoporous fillers made of metal oxide between the electrodes as ion-conduction paths leads to improvement in the conductivity of an electrolyte, the discharge capacity of the power storage device at room temperature is not improved yet, for example.

In addition, the mesoporous filler disclosed in Patent Document 1 has a disadvantage that the conductivity is too low at room temperature. For this reason, the power storage device including the mesoporous filler might not operate when not heated.

SUMMARY OF THE INVENTION

In view of the above, an object of one embodiment of the disclosed invention is to provide a method for manufacturing a power storage device including a solid electrolyte and operating at room temperature.

Further, an object of one embodiment of the disclosed invention is to provide a method for manufacturing a power storage device including a solid electrolyte and having higher discharge capacity.

One embodiment of the disclosed invention relates to a method for manufacturing a power storage device including the steps of providing an electrolyte including an ion-conducting high molecular compound, an inorganic oxide, and a lithium electrolyte salt between a positive electrode and a negative electrode; performing charge at a first current value and then at a first voltage value obtained by the charge at the first current value, between the positive electrode and the negative electrode at room temperature; and performing discharge at a second current value after the charge at the first voltage value is performed.

In one embodiment of the disclosed invention, charge at a constant current and a constant voltage and discharge at a constant current are performed at room temperature, whereby carrier ions in the electrolyte, which are less likely to migrate, become movable.

In one embodiment of the disclosed invention, charge at a constant current and a constant voltage and discharge at a constant current are collectively called aging treatment. In the aging treatment, first, the power storage device is charged at a given current value. Next, after a given voltage value is obtained by charging the power storage device at the constant current, the charge is continued at the given voltage value. Further, the power storage device is discharged at a given current value. Here, the aging treatment can be considered as parts of manufacturing process of a power storage device or operation steps after manufacturing a power storage device In the power storage device that is one embodiment of the disclosed invention, charge at a constant current and a constant voltage and discharge at a constant current, in particular, charge at a constant current and a constant voltage enables migration of not only carrier ions in an active material layer which are likely to migrate (e.g., lithium ions) but also carrier ions in the active material layer which are less likely to migrate.

As an example of carrier ions in the active material layer which are likely to migrate, carrier ions whose distance of migration is short because they exist in a region close to the solid electrolyte, and the like are given. As an example of carrier ions in the active material layer which are less likely to migrate, carrier ions whose distance of migration is long because they exist in a region far from the solid electrolyte (e.g., a region close to a current collector), and the like are given.

As described above, a method for manufacturing a power storage device including a solid electrolyte and operating at room temperature or a method for operating the power storage device can be provided.

Further, a method for manufacturing a power storage device including a solid electrolyte and having higher discharge capacity or a method for operating the power storage device can be provided.

In one embodiment of the disclosed invention, the ion-conducting high molecular compound is polyalkylene oxide.

In one embodiment of the disclosed invention, the polyalkylene oxide is one of or both polyethylene oxide and polypropylene oxide.

In one embodiment of the disclosed invention, the inorganic oxide is one or more of silicon oxide, titanium oxide, zirconium oxide, aluminum oxide, zinc oxide, iron oxide, cerium oxide, magnesium oxide, antimony oxide, germanium oxide, lithium oxide, graphite oxide, barium titanate, and lithium metasilicate.

In one embodiment of the disclosed invention, the lithium electrolyte salt is one or more of $LiN(SO_2CF_3)_2$, $LiN(SO_2C_2F_5)_2$, $LiCF_3SO_3$, $LiPF_6$, $LiBF_4$, $LiClO_4$, and LiSCN.

In one embodiment of the disclosed invention, the diameter of a particle of the inorganic oxide is greater than or equal to 50 nm and less than or equal to 10 μm.

According to one embodiment of the disclosed invention, a method for manufacturing a power storage device including a solid electrolyte and operating at room temperature or a method for operating the power storage device can be provided.

According to one embodiment of the disclosed invention, a method for manufacturing a power storage device including a solid electrolyte and having higher discharge capacity or a method for operating the power storage device can be provided.

DETAILED DESCRIPTION OF THE INVENTION

Figure 1:
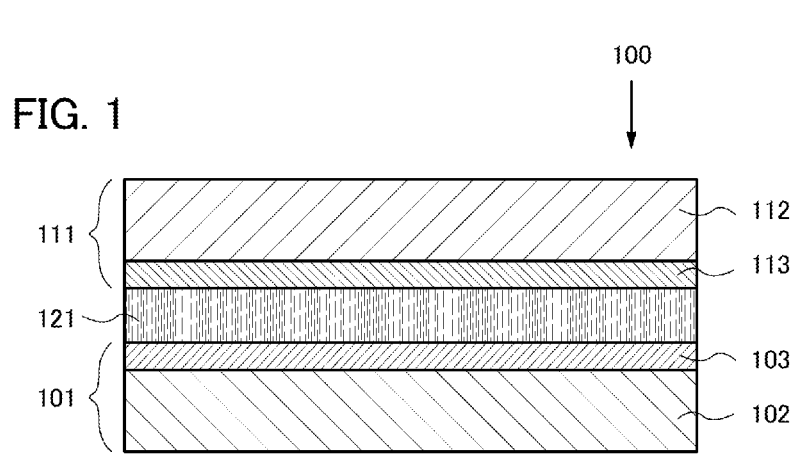
FIG. 1 is a cross-sectional view of a power storage device.

Embodiments of the invention disclosed in this specification are hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and the scope of the invention. Therefore, the present invention is not construed as being limited to description of the embodiments. Note that in the drawings, the same portions or portions having a similar function are denoted by the same reference numeral, and the description will not be repeated.

Note that the position, size, range, or the like of each structure illustrated in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

Embodiment 1

One embodiment of a power storage device of this embodiment is described with reference to FIG. 1. Here, a structure of a secondary battery is described below as a power storage device.

As a secondary battery, a lithium-ion secondary battery using a lithium-containing metal oxide has a large capacity and high safety. Here, a structure of a lithium-ion secondary battery that is a typical example of a secondary battery is described.

FIG. 1 is a cross-sectional view of a power storage device 100.

The power storage device 100 includes a negative electrode 101, a positive electrode 111, and a solid electrolyte (hereinafter, referred to as an electrolyte 121) sandwiched between the negative electrode 101 and the positive electrode 111. In addition, the negative electrode 101 may include a negative electrode current collector 102 and a negative electrode active material layer 103. The positive electrode 111 may include a positive electrode current collector 112 and a positive electrode active material layer 113. In addition, the electrolyte 121 is in contact with the negative electrode active material layer 103 and the positive electrode active material layer 113.

The negative electrode current collector 102 and the positive electrode current collector 112 are connected to different external terminals. In addition, the negative electrode 101, the electrolyte 121, and the positive electrode 111 are covered with an exterior material which is not shown.

Note that the active material refers to a material that relates to insertion and extraction of ions as carriers and does not include a carbon layer using glucose or the like. When an electrode such as a positive electrode or a negative electrode is formed by a coating method as described later, an active material layer is formed over the current collector using the active material provided with the carbon layer and those obtained by mixing other materials such as a conduction auxiliary agent, a binder, and a solvent. Thus, the active material and the active material layer are distinguished.

First, the electrolyte 121 included in the power storage device 100 in this embodiment is described.

The electrolyte 121 includes an ion-conducting high molecular compound, an inorganic oxide, and an alkali metal electrolyte salt. Note that the electrolyte 121 may have plural kinds of ion-conducting high molecular compounds. Further, the electrolyte 121 may include plural kinds of inorganic oxides. Furthermore, the electrolyte 121 may include plural kinds of alkali metal electrolyte salts.

A typical example of the ion-conducting high molecular compound is polyalkylene oxide having a molecular weight in the range of ten thousand to a million. Typical examples of polyalkylene oxide include polyethylene oxide, polypropylene oxide, polyphenylene oxide, and the like.

Examples of the inorganic oxide include silicon oxide, titanium oxide, zirconium oxide, aluminum oxide, zinc oxide, iron oxide, cerium oxide, magnesium oxide, antimony oxide, germanium oxide, lithium oxide, graphite oxide, barium titanate, lithium metasilicate, and the like.

The diameter of a particle of the inorganic oxide is preferably greater than or equal to 50 nm and less than or equal to 10 μm.

Examples of the alkali metal electrolyte salt include a lithium electrolyte salt, a sodium electrolyte salt, and the like. Typical examples of the lithium electrolyte salt include $LiCF_3SO_3$, $LiPF_6$, $LiBF_4$, $LiClO_4$, $LiSCN$, $LiN(SO_2CF_3)_2$ (also referred to as LiTFSI), $LiN(SO_2C_2F_5)_2$ (also referred to as LiBETI), and the like. Typical examples of the sodium electrolyte salt include $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$, and the like.

In the electrolyte, the ion-conducting high molecular compound, the inorganic oxide, and the alkali metal electrolyte salt are mixed at 15 wt % to 65 wt %, 12 wt % to 80 wt %, and 5 wt % to 50 wt %, respectively, to be included at total 100 wt %.

Next, the negative electrode 101 included in the power storage device 100 in this embodiment is described.

As the negative-electrode current collector 102, a material having high conductivity such as copper, stainless steel, iron, or nickel can be used. The negative electrode current collector 102 can have a shape such as a foil shape, a plate shape, or a net shape as appropriate.

The negative electrode active material layer 103 is formed using a material capable of lithium-ion occlusion and emission. As the negative electrode active material layer 103, lithium, aluminum, graphite, silicon, tin, germanium, or the like is typically used. The negative electrode current collector 102 may be omitted and the negative electrode active material layer 103 alone may be used as the negative electrode. The theoretical lithium occlusion capacity of germanium, silicon, lithium, and aluminum is larger than that of graphite. When the occlusion capacity is large, charge and discharge can be performed sufficiently even in a small area and a function as a negative electrode can be obtained; therefore, cost reduction and miniaturization of a secondary battery can be realized. However, in the case of silicon or the like, the volume is approximately quadrupled due to lithium occlusion; therefore, it is necessary to pay attention to the probability that the material itself gets vulnerable, and the like.

Note that the negative electrode active material layer 103 may be predoped with lithium. As a method for predoping with lithium, a lithium layer may be formed on a surface of the negative electrode active material layer 103 by a sputtering method. Alternatively, lithium foil is provided on the surface of the negative electrode active material layer 103, whereby the negative electrode active material layer 103 can be predoped with lithium.

A desired thickness of the negative electrode active material layer 103 is selected from the range of 20 µm to 100 µm.

Note that the negative electrode active material layer 103 may include a binder and a conduction auxiliary agent.

Examples of the binder include polysaccharides, thermoplastic resins, and polymers with rubber elasticity, and the like. For example, starch, carboxymethylcellulose, hydroxypropylcellulose, regenerated cellulose, diacetylcellulose, polyvinylchloride, polyvinylpyrrolidone, polytetrafluoroethylene, polyvinylide fluoride, polyethylene, polypropylene, ethylene-propylene-diene monomer (EPDM), sulfonated EPDM, styrene-butadiene rubber, butadiene rubber, fluorine rubber, or the like can be used. In addition, polyimide, polyvinyl alcohol, polyethylene oxide, or the like may be used.

As the conduction auxiliary agent, a material which is itself an electron conductor and does not cause chemical reaction with other materials in a power storage device may be used. For example, carbon-based materials such as graphite, carbon fiber, carbon black, acetylene black, and VGCF (registered trademark); metal materials such as copper, nickel, aluminum, and silver; and powder, fiber, and the like of mixtures thereof can be given. The conduction auxiliary agent is a material that promotes conduction between active materials; it is provided between separate active materials so as to make conduction between the active materials.

Next, the positive electrode 111 included in the power storage device 100 described in this embodiment is described.

As the positive electrode current collector 112, a material having high conductivity such as platinum, aluminum, copper, titanium, or stainless steel can be used. The positive electrode current collector 112 can have a shape such as a foil shape, a plate shape, or a net shape as appropriate.

Examples of materials used for the positive electrode active material layer 113 include $LiFeO_2$, $LiCoO_2$, $LiNiO_2$, $LiMn_2O_4$, $LiFePO_4$, $Li_3Fe_2(PO_4)_3$, $LiCoPO_4$, $LiNiPO_4$, $LiMn_2PO_4$, $Li_{1-x1}Fe_{y1}M_{1-y1}PO_4$ ($x_1$ is greater than or equal to 0 and less than or equal to 1; M is one or more of Mn, Co, and Ni; and $y_1$ is greater than or equal to 0 and less than 1), $Li_2FeSiO_4$, $Li_2MnSiO_4$, $V_2O_5$, $Cr_2O_5$, $MnO_2$, and other materials. Alternatively, an organic compound such as rubeanic acid may be used as the positive electrode active material layer 113.

As the thickness of the positive electrode active material layer 113, a desired thickness is selected from the range of 20 µm to 100 µm. It is preferable to adjust the thickness of the positive electrode active material layer 113 as appropriate so that cracks and separation do not occur.

In addition, the positive electrode active material layer 113 may include a binder and a conduction auxiliary agent, similarly to the negative electrode active material layer 103. The binders and the conduction auxiliary agents listed for those of the negative electrode active material layer 103 can be used as appropriate for the positive electrode active material layer 113.

A lithium-ion battery has a small memory effect, a high energy density, a large capacity, and further a high output voltage. For these reasons, the size and weight of the lithium ion secondary battery can be reduced. Further, the lithium ion secondary battery does not easily degrade due to repetitive charge and discharge and can be used for a long time, so that cost can be reduced. In addition, in this embodiment, since the electrolyte includes both an ion-conducting high molecular compound and an inorganic oxide, crystallization of the ion-conducting high molecular compound is suppressed, so that the ionic conductivity of the electrolyte is increased. As a result, carrier ions between the positive electrode and the negative electrode become movable, so that discharge capacity can be increased.

Next, a method for manufacturing the power storage device 100 described in this embodiment is described with reference to FIG. 2 and FIG. 3.

Figure 2:
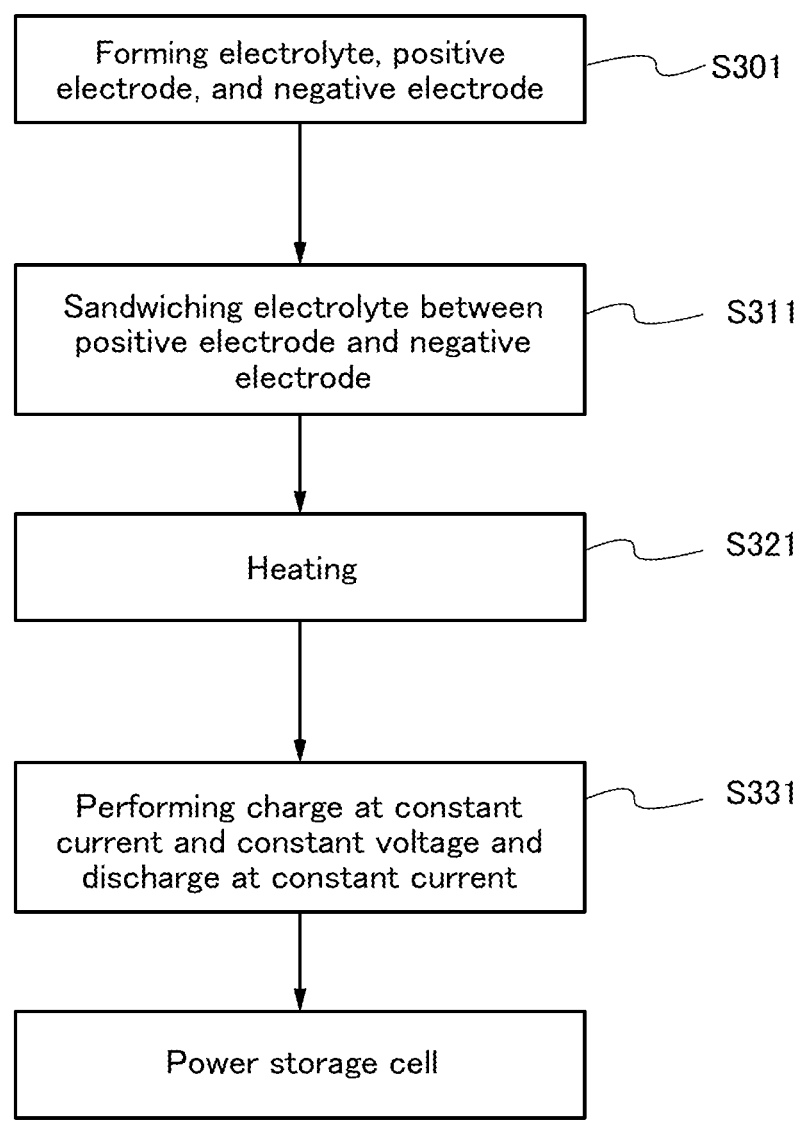
FIG. 2 is a diagram showing a method for manufacturing a power storage device.

As shown in a step S301 in FIG. 2, the electrolyte, the positive electrode, and the negative electrode are formed.

First, a method for forming the electrolyte is described with reference to FIG. 3 and FIGS. 4A to 4D.

An ion-conducting high molecular compound, an inorganic oxide, and an alkali metal electrolyte salt are weighed as materials of the electrolyte, and a solvent is weighed. As the solvent, dehydrated acetonitrile, lactic acid ester, N-methyl-2-pyrrolidone (NMP), or the like can be used.

Here, polyethylene oxide; a mixture of silicon oxide and aluminum oxide, and lithium oxide; and LiTFSI are used as the ion-conducting high molecular compound, the inorganic oxide, and the alkali metal electrolyte salt, respectively. Dehydrated acetonitrile is used as the solvent.

Figure 3:
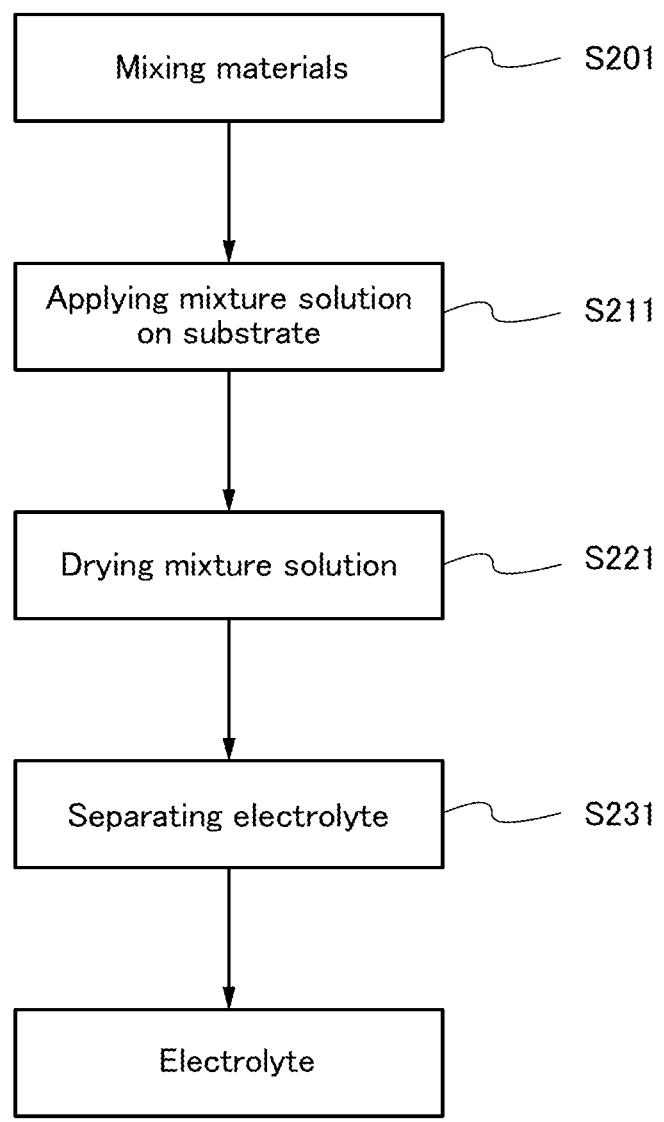
FIG. 3 is a diagram showing a method for forming an electrolyte in a power storage device.

Next, as shown in a step S201 in FIG. 3, the materials of the electrolyte and the solvent are mixed, so that a mixture solution is obtained.

Here, one mode in which the materials of the electrolyte are mixed evenly in the step S201 is described with reference to FIGS. 4A to 4D. At this time, the materials in a container can be agitated evenly with use of an agitator which is capable of rotating and revolving at the same time.

Figure 4A:
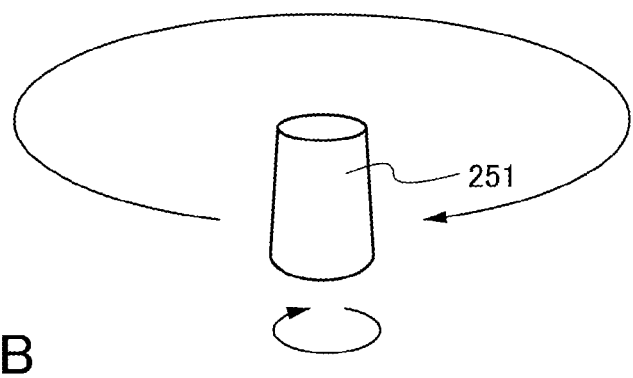
FIGS. 4A to 4D are diagrams illustrating a method for forming an electrolyte in a power storage device.
Figure 4B:
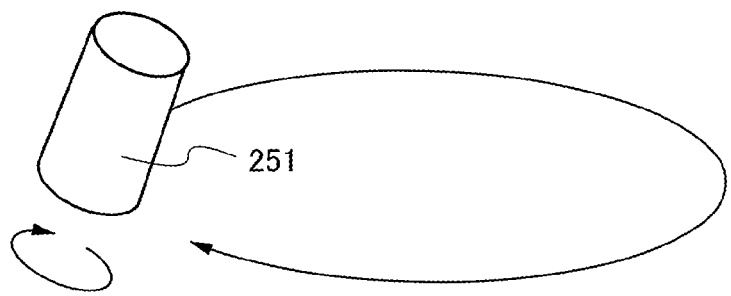
Figure 4C:
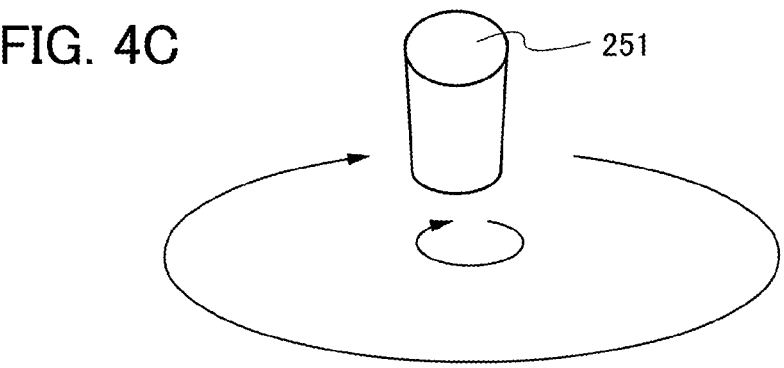
Figure 4D:
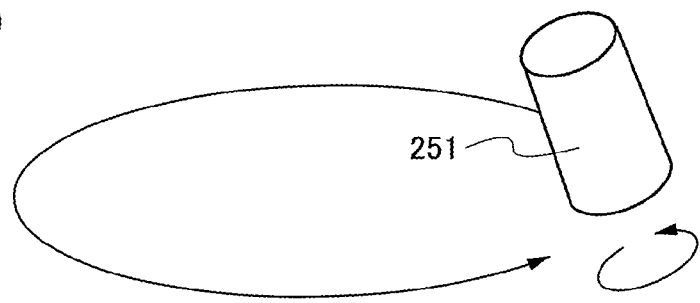

As illustrated in FIG. 4A, a container 251 where materials of the electrolyte are put is installed in the agitator, and the container 251 is revolved clockwise while the container 251 is being rotated. FIG. 4B, FIG. 4C, and FIG. 4D illustrate states where the container 251 is revolved at 90 degree, 180 degree, and 270 degree, respectively from the state illustrated in FIG. 4A. In this manner, by rotating and revolving the container 251 at the same time, the materials can be evenly mixed, without inclusion of air at the time of agitating the electrolyte.

Next, as shown in a step S211 in FIG. 3, the mixture solution is applied on a substrate. The substrate may be an appropriate one having a heat resistance higher than the temperature of a later drying step. Typical examples of the substrate include a glass substrate, a wafer substrate, a plastic substrate, and the like. In this case, a glass substrate is used as the substrate. Then, the substrate is set in an automatic coating device and the substrate is coated with the mixture solution.

Next, as shown in a step S221 in FIG. 3, the mixture solution applied on the substrate is dried. The mixture solution may be heated at temperature which allows the solvent to vaporize. Here, the solvent is vaporized in a circulation dryer for drying. In this manner, the electrolyte is formed on the substrate.

Next, as shown in a step S231 in FIG. 3, the electrolyte is separated from the substrate. Since the inorganic oxide is mixed in the electrolyte, the electrolyte can be easily separated from the substrate. At this time, the electrolyte is separated from the substrate with the use of tweezers.

Then, another drying treatment may be performed. In this manner, moisture, solvent, and the like can be removed from the electrolyte.

Through the above steps, the electrolyte can be formed.

Next, a method for forming the negative electrode is described.

The negative electrode active material layer 103 is formed over the negative electrode current collector 102 by a coating method, a sputtering method, an evaporation method, or the like, and thereby the negative electrode is formed. Alternatively, for the negative electrode, foil, a plate, or mesh of lithium, aluminum, graphite, or silicon can be used. Here, graphite predoped with lithium is used as the negative electrode.

Next, a method for forming the positive electrode is described.

The positive electrode active material layer 113 is formed over the positive electrode current collector 112 by a coating method, a sputtering method, an evaporation method, or the like, and thereby the positive electrode is formed.

Next, as shown in a step S311 in FIG. 2, the positive electrode, the electrolyte, and the negative electrode are stacked in this order, and the electrolyte is sandwiched with the positive electrode and the negative electrode.

Next, as shown in a step S321, the positive electrode and the negative electrode between which the electrolyte is sandwiched are heated at 50° C., for example.

Next, as shown in a step S331, charge at a constant current and a constant voltage and discharge at a constant current are performed. The temperature at this time is room temperature. Charge at a constant current and a constant voltage means that charge is performed at a given current value first, and after the given voltage value is obtained, charge is performed at the voltage value. Discharge at a constant current means that discharge is performed at a given current value. Note that the current value for the charge at a constant current may be the same as or different from the current value for the discharge at a constant current.

Through the above steps, the power storage cell can be formed.

In this embodiment, when the power storage cell is manufactured, charge at a constant current and a constant voltage and discharge at a constant current are performed after the electrolyte is sandwiched between the positive electrode and the negative electrode.

In this embodiment, when charge at a constant current and a constant voltage and discharge at a constant current (aging treatment) are performed, first, the power storage cell is charged at a given current value. Next, after the power storage cell is charged and a given voltage value is obtained, the charge is continued at the given voltage value. Further, the power storage cell is discharged at a given current value.

Thus, not only carrier ions in the active material layer which are likely to migrate (e.g., lithium ions) but also carrier ions in the active material layer which are less likely to migrate can be movable.

In the aforementioned manner, a power storage device including a solid electrolyte and operating at room temperature can be provided.

According to this embodiment, a power storage device including a solid electrolyte and having higher discharge capacity can be provided.

Embodiment 2

In this embodiment, in order to obtain higher discharge capacity than that of the power storage device described in Embodiment 1, one of or both the positive electrode and the negative electrode of the power storage device described in Embodiment 1 are formed with a coating method.

A power storage device described in this embodiment includes a positive electrode, an electrolyte, and a negative electrode. As the electrolyte, the electrolyte described in Embodiment 1 can be used as appropriate.

A negative electrode active material layer constituting a part of the negative electrode includes particles of aluminum, graphite, silicon, tin, germanium, or the like serving as an active material, a conduction auxiliary agent, and a binder. As the binder, a high molecular compound having a softening point lower than or equal to that of the ion-conducting high molecular compound included in the electrolyte is used.

In addition, the positive electrode active material layer constituting a part of the positive electrode includes a conduction auxiliary agent, a binder, and an active material such as $LiFeO_2$, $LiCoO_2$, $LiNiO_2$, $LiMn_2O_4$, $LiFePO_4$, $Li_3Fe_2(PO_4)_3$, $LiCoPO_4$, $LiNiPO_4$, $LiMn_2PO_4$, $Li_{1-x1}Fe_{y1}M_{1-y1}PO_4$ ($x_1$ is greater than or equal to 0 and less than or equal to 1; M is one or more of Mn, Co, and Ni; and $y_1$ is greater than or equal to 0 and less than 1), $Li_2FeSiO_4$, $Li_2MnSiO_4$, $V_2O_5$, $Cr_2O_5$, or $MnO_2$. Further, a high molecular compound having a softening point lower than or equal to that of the ion-conducting high molecular compound included in the electrolyte is used as a binder.

A styrene-butadiene copolymer is given as an example of a high molecular compound having a softening point lower than or equal to that of the ion-conducting high molecular compound included in the electrolyte.

Alternatively, instead of the high molecular compound having a softening point lower than or equal to that of the ion-conducting high molecular compound included in the electrolyte, an ion-conducting high molecular compound having a softening point lower than or equal to that of the ion-conducting high molecular compound included in the electrolyte may be used as a binder. In this case, the ion-conducting high molecular compound included in the electrolyte and the binder included in the positive electrode active material layer may be the same ion-conducting high molecular compound or different ion-conducting high molecular compounds.

Note that in this embodiment, in at least one of the positive electrode active material layer and the negative electrode active material layer, a high molecular compound having a softening point lower than or equal to that of the ion-conducting high molecular compound included in the electrolyte is preferably used as a binder.

Next, a method for manufacturing the power storage device described in this embodiment is described with reference to FIG. 2.

As shown in a step S301 in FIG. 2, the electrolyte, the positive electrode, and the negative electrode are formed. The electrolyte can be formed in a manner similar to that in Embodiment 1.

Next, methods for forming the negative electrode and the positive electrode are described.

First, the method for forming the negative electrode described in this embodiment is described.

A negative electrode active material, a conduction auxiliary agent, a binder, and a solvent are mixed. As the binder, a high molecular compound having a softening point lower than or equal to that of the ion-conducting high molecular compound included in the electrolyte, which is described in this embodiment, can be used as appropriate.

The negative electrode active material, the conduction auxiliary agent, and the binder are mixed at 80 wt % to 96 wt %, 2 wt % to 10 wt %, and 2 wt % to 10 wt %, respectively, to be 100 wt % in total. Further, an organic solvent, the volume of which is approximately the same as that of the mixture of the active material, the conduction auxiliary agent, and the binder, is mixed in the mixture to form slurry. The proportions of the active material, the conduction auxiliary agent, and the binder are preferably adjusted as appropriate in such a manner that, for example, when the active material and the conduction auxiliary agent have low adhesiveness in the active material layer to be formed later, the amount of binder is increased, and when the resistance of the active material is high, the amount of the conduction auxiliary agent is increased.

Next, the slurry is applied on the negative electrode current collector by a cast method, a coating method, or the like, and the applied slurry is spread thinly and extended with a roller press machine, so that the thickness is made uniform. Then, treatment such as vacuum drying (lower than or equal to 10 Pa) or heat drying (150° C. to 280° C.) is conducted, whereby the negative electrode active material layer is formed on the negative electrode current collector.

Similar to the negative electrode, the positive electrode is formed in such a manner that a positive electrode active material, a conduction auxiliary agent, a binder, and a solvent are mixed to form slurry, and then the slurry is applied on the positive electrode current collector and dried, so that the positive electrode active material is formed on the positive electrode current collector. As the binder, a high molecular compound having a softening point lower than or equal to that of the ion-conducting high molecular compound included in the electrolyte, which is described in this embodiment, can be used as appropriate.

Next, as shown in the step S311 in FIG. 2, the positive electrode, the electrolyte, and the negative electrode are stacked in this order, and the electrolyte is sandwiched between the positive electrode and the negative electrode.

Next, as shown in the step S321, the positive electrode and the negative electrode between which the electrolyte is sandwiched are heated at 50° C., for example.

Then, as shown in the step S331, charge at a constant current and a constant voltage and discharge at a constant current (aging treatment) are performed. Note that the temperature at this time is room temperature. The steps of the aging treatment in this embodiment are similar to those in Embodiment 1.

Through the above steps, the power storage cell can be manufactured.

In this embodiment, when the power storage cell is manufactured, the electrolyte is sandwiched between the positive electrode and the negative electrode, and then the power storage cell is charged at a constant current and a constant voltage and discharged at a constant current. Thus, not only carrier ions in the active material layer which are likely to migrate (e.g., lithium ions) but also carrier ions in the active material layer which are less likely to migrate can be movable.

In the aforementioned manner, the power storage device including the solid electrolyte and operating at room temperature can be provided.

According to this embodiment, the power storage device including the solid electrolyte and having higher discharge capacity can be provided.

Embodiment 3

In this embodiment, an application of the power storage device described in Embodiment 1 or 2 is described with reference to FIGS. 10A and 10B.

The power storage device described in Embodiment 1 or 2 can be used in electronic devices, e.g., cameras such as digital cameras or video cameras, digital photo frames, mobile phones (also referred to as cellular phones or cellular phone devices), portable game machines, portable information terminals, or audio reproducing devices. Further, the lithium ion secondary battery can be used in electric propulsion vehicles such as electric cars, hybrid cars, railway train vehicles, maintenance vehicles, carts, or electric wheelchairs. Here, an example of the electric propulsion vehicle is described.

Figure 10A:
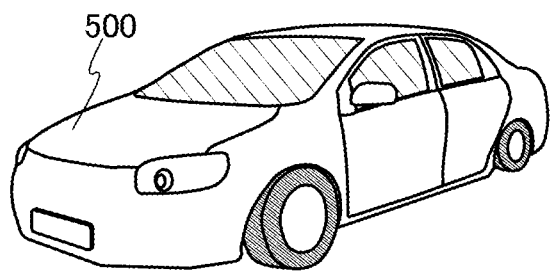
FIGS. 10A and 10B are perspective views of an application of a power storage device.
Figure 10B:
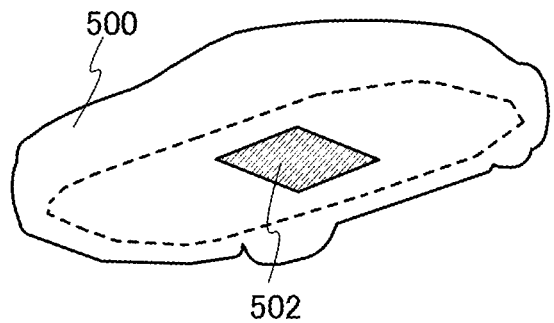

FIG. 10A shows a structure of a four-wheeled automobile 500 as an example of the electric propulsion vehicles. The automobile 500 is an electric vehicle or a hybrid vehicle. An example is shown in which the automobile 500 includes a power storage device 502 provided on its bottom portion. In order to clearly show the position of the power storage device 502 in the automobile 500, FIG. 10B shows the outline of the automobile 500 and the power storage device 502 provided on the bottom portion of the automobile 500. The lithium ion secondary battery described in Embodiment 1 or 2 can be used as the power storage device 502. The power storage device 502 can be charged by a plug-in technique or a wireless power feeding system, which supplies power from the outside.

Embodiment 4

In this embodiment, examples of using a power storage device according to one embodiment of the present invention in a wireless power feeding system (hereinafter referred to as an RF power feeding system) is described with reference to block diagrams in FIG. 11 and FIG. 12. In each of the block diagrams, blocks show elements independently, which are classified according to their functions, within a power receiving device and a power feeding device. However, it is practically difficult to completely separate the elements according to their functions; in some cases, one element can involve a plurality of functions.

First, the RF power feeding system is described with reference to FIG. 11.

A power receiving device 600 is an electronic device or an electric propulsion vehicle which is driven by electric power supplied from a power feeding device 700, and can be applied to any other devices which are driven by electric power, as appropriate. Typical examples of the electronic device include cameras such as digital cameras or video cameras, digital photo frames, mobile phones, portable game machines, portable information terminals, audio reproducing devices, display devices, computers, and the like. Typical examples of the electric propulsion vehicle include electric cars, hybrid cars, railway train vehicles, maintenance vehicles, carts, electric wheelchairs, and the like. In addition, the power feeding device 700 has a function of supplying electric power to the power receiving device 600.

Figure 11:
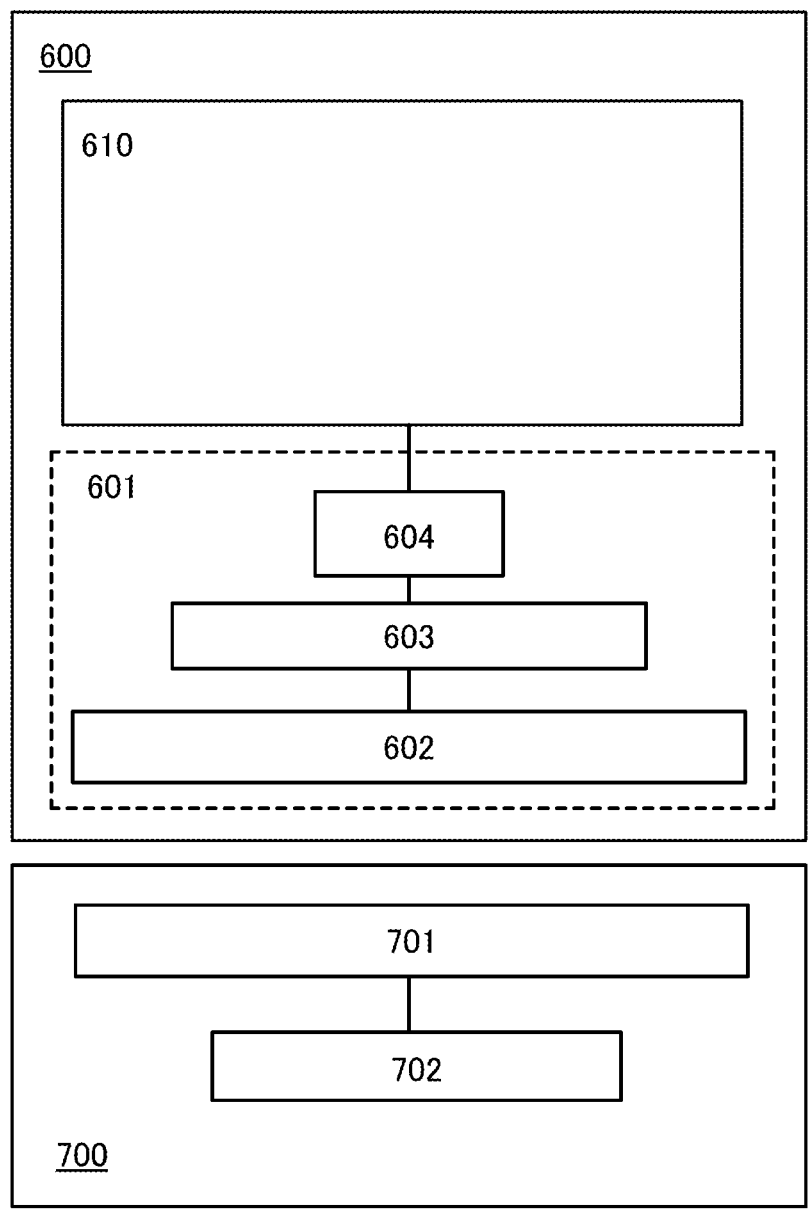
FIG. 11 illustrates an example of a structure of a wireless power feeding system.

In FIG. 11, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 and transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor, a driving circuit, and the like. Another device which drives the power receiving device by receiving electric power can be used as the power load portion 610 as appropriate. The power feeding device antenna circuit 701 has a function of transmitting a signal to the power receiving device antenna circuit 602 and receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system shown in FIG. 11.

With the use of the secondary battery according to one embodiment of the present invention for the RF power feeding system, the discharge capacity or the charge capacity (also referred to as the amount of power storage) can be high as compared with that of a conventional secondary battery. Therefore, since the time interval of the wireless power feeding can be longer, power feeding can be less frequent.

In addition, with the use of the secondary battery according to one embodiment of the present invention for the RF power feeding system, the power receiving device 600 can be compact and lightweight if the discharge capacity or the charge capacity with which the power load portion 610 can be driven is the same as that of a conventional secondary battery. Therefore, the total cost can be reduced.

Next, another example of the RF power feeding system is described with reference to FIG. 12.

Figure 12:
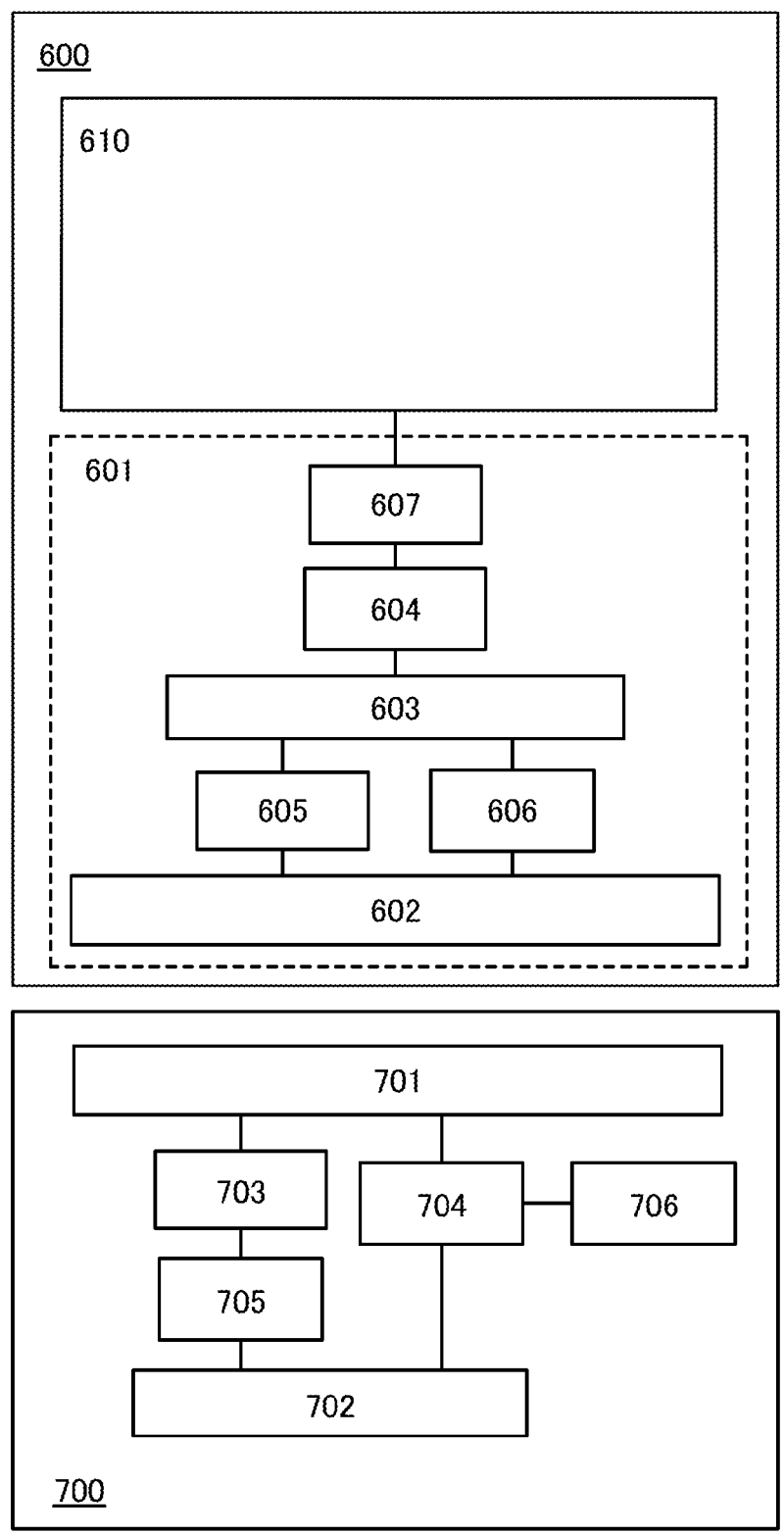
FIG. 12 illustrates an example of a structure of a wireless power feeding system.

In FIG. 12, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 and transmitting a signal to the power feeding device antenna circuit 701. In the case where the power receiving device antenna circuit 602 receives a signal transmitted by the power feeding device antenna circuit 701, the rectifier circuit 605 has a function of generating DC voltage from the signal received by the power receiving device antenna circuit 602. The signal processing circuit 603 has a function of processing a signal received by the power receiving device antenna circuit 602 and controlling charge of the secondary battery 604 and supply of electric power from the secondary battery 604 to the power supply circuit 607. The power supply circuit 607 has a function of converting voltage stored in the secondary battery 604 into voltage needed for the power load portion 610. The modulation circuit 606 is used when a certain response is transmitted from the power receiving device 600 to the power feeding device 700.

With the power supply circuit 607, electric power supplied to the power load portion 610 can be controlled. Thus, overvoltage application to the power load portion 610 can be suppressed, which leads to reduction of deterioration or breakdown of the power receiving device 600.

In addition, with the modulation circuit 606, a signal can be transmitted from the power receiving device 600 to the power feeding device 700. Therefore, when the amount of charged power in the power receiving device 600 is detected and a certain amount of power is charged, a signal is transmitted from the power receiving device 600 to the power feeding device 700 so that power feeding from the power feeding device 700 to the power receiving device 600 can be stopped. As a result, the secondary battery 604 is not fully charged, so that the number of charge cycles of the secondary battery 604 can be increased.

The power feeding device antenna circuit 701 has a function of transmitting a signal to the power receiving device antenna circuit 602 and receiving a signal from the power receiving device antenna circuit 602. When a signal is transmitted to the power receiving device antenna circuit 602, the signal processing circuit 702 generates a signal which is transmitted to the power receiving device. The oscillator circuit 706 is a circuit which generates a signal with a constant frequency. The modulation circuit 704 has a function of applying voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 has a function of rectifying the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any circuit may be provided between the circuits as long as the RF power feeding can be performed. For example, after the power receiving device 600 receives a signal and the rectifier circuit 605 generates DC voltage, a circuit such as a DC-DC converter or regulator that is provided in a subsequent stage may generate constant voltage. Thus, overvoltage application to the inside of the power receiving device 600 can be suppressed.

The secondary battery according to one embodiment of the present invention is used as the secondary battery 604 included in the power receiving device 600 in the RF power feeding system shown in FIG. 12.

When the lithium ion secondary battery according to one embodiment of the present invention is used in the RF power feeding system, the discharge capacity or the charge capacity can be high as compared with that of a conventional secondary battery; therefore, the time interval of the wireless power feeding can be longer, so that power feeding can be less frequent.

In addition, when the lithium ion secondary battery according to one embodiment of the present invention is used in the RF power feeding system, the power receiving device 600 can be compact and lightweight if the discharge capacity or the charge capacity with which the power load portion 610 can be driven is the same as that of a conventional secondary battery. Therefore, the total cost can be reduced.

Note that when the secondary battery according to one embodiment of the present invention is used in the RF power feeding system and the power receiving device antenna circuit 602 and the secondary battery 604 overlap with each other, it is preferred that the impedance of the power receiving device antenna circuit 602 is not changed by deformation of the secondary battery 604 due to charge and discharge of the secondary battery 604 and deformation of an antenna due to the above deformation. If the impedance of the antenna is changed, in some cases, electric power is not supplied sufficiently. For example, the secondary battery 604 may be placed in a battery pack formed of metal or ceramics. Note that in that case, the power receiving device antenna circuit 602 and the battery pack are preferably separated from each other by several tens of micrometers or more.

In this embodiment, the signal for charge has no limitation on its frequency and may have any band of frequency with which electric power can be transmitted. For example, the signal for charge may have any of an LF band of 135 kHz (long wave), an HF band of 13.56 MHz (short wave), a UHF band of 900 MHz to 1 GHz (ultra high frequency wave), and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, frequencies of short waves of from 3 MHz to 30 MHz, frequencies of medium waves of from 300 kHz to 3 MHz, frequencies of long waves of from 30 kHz to 300 kHz, or frequencies of ultra long waves of from 3 kHz to 30 kHz, is preferably used.

This embodiment can be implemented in combination with any of the above-described embodiments.

Example 1

In this example, charge and discharge characteristics of a power storage device according to one embodiment of the disclosed invention are described with reference to FIG. 5, FIG. 6, FIG. 7, FIG. 8, and FIG. 9.

First, manufacturing steps and a structure of a lithium ion secondary battery as one example of the power storage device are described.

<Formation Steps and Structure of Electrolyte>

As materials of an electrolyte, the following materials were weighed: 1 g of polyethylene oxide (hereinafter referred to as PEO and the softening point thereof is 65° C. to 67° C.), 0.33 g of lithium bis(trifluoromethanesulfonyl) imide ($LiN(SO_2CF_3)_2$ (hereinafter referred to as LiTFSI)), 0.1 g of silicon oxide (hereinafter referred to as $SiO_2$), 0.29 g of lithium oxide (hereinafter referred to as $Li_2O$), and 0.11 g of aluminum oxide (hereinafter referred to as $Al_2O_3$).

Then, as a solvent, 12 ml of dehydrated acetonitrile was mixed into the mixture of PEO, LiTFSI, $SiO_2$, $Li_2O$, and $Al_2O_3$, whereby a mixture solution was formed.

Next, a glass substrate was set in an automatic coating device. The mixture solution was applied onto the glass substrate. At this time, the thickness of the mixture solution applied on the glass substrate was 300 μm.

Next, the substrate was set in a circulation dryer the inside of which is at room temperature and the mixture solution was air-dried, so that the electrolyte was formed.

Then, after the electrolyte was separated from the glass substrate, the electrolyte sandwiched between the two fluororesin sheets was heated in a vacuum dryer at 80° C. for three hours, whereby the solvent in the electrolyte was dried. Through these steps, the electrolyte including PEO, LiTFSI, $SiO_2$, $Li_2O$, and $Al_2O_3$ was formed.

<Structure of Positive Electrode>

As materials for the active material layer, 79.4 g of $LiFePO_4$, 14.8 g of acetylene black, 5.0 g of PEO, and 0.8 g of $LiPF_6$ were mixed to form slurry.

Then, the slurry was applied on aluminum foil serving as a current collector and then vacuum drying and heat drying were conducted so that the active material layer was formed. Through these steps, the positive electrode including the active material layer on the current collector was formed.

<Structure of Negative Electrode>

Lithium foil was prepared as the negative electrode. The lithium foil functions as both a current collector and an active material.

<Steps for Manufacturing Secondary Battery>

Next, steps for manufacturing the secondary battery of this example are described.

The electrolyte was sandwiched between the positive electrode and the negative electrode to manufacture the secondary battery. And then, the secondary battery was provided with an insulating O-ring, a spacer, a spring, or the like, so that the power storage cell was manufactured.

After the power storage cell was manufactured, the power storage cell was heated at 50° C.

Figure 5:
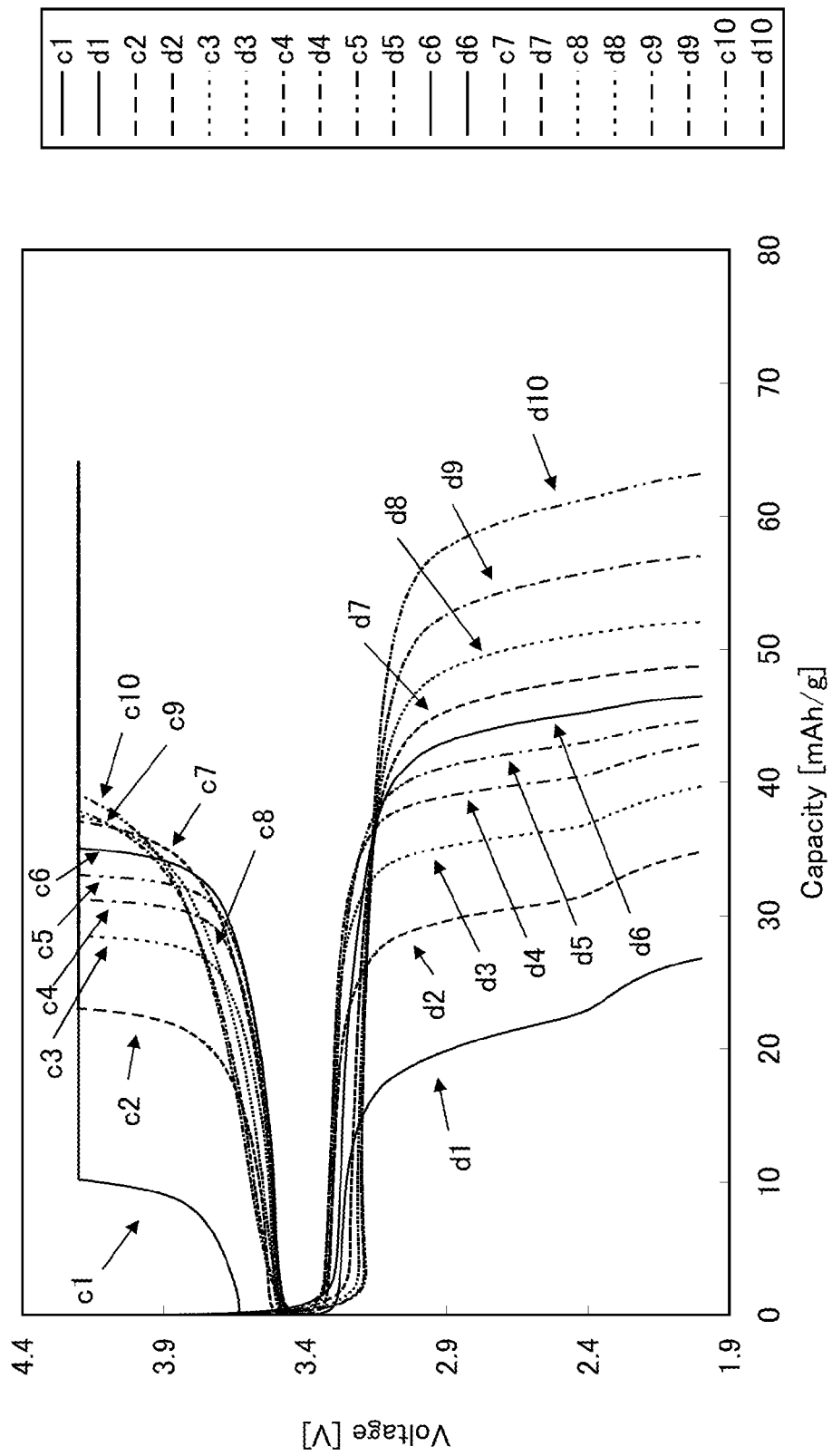
FIG. 5 is a graph showing the relation between capacity and voltage in the case of performing charge at a constant voltage and a constant current and discharge at a constant current (aging treatment).

Next, voltage was applied to the positive electrode and the negative electrode of the power storage cell to perform charge at a constant current and a constant voltage and discharge at a constant current (hereinafter referred to as aging treatment) at room temperature (25° C.). When the aging treatment was performed, the power storage cell was charged at a current of 0.02 mA. After the voltage reached 4.2 V, the voltage was fixed at 4.2 V and the charge was continued. Further, the power storage cell was discharged at a current of 0.02 mA. Charge and discharge were repeated 10 times during the aging treatment. The relation between capacity and voltage in this case is shown in FIG. 5. Note that in FIG. 5, "c" and "d" denote charge and discharge, respectively, and the numbers denote the number of charge and discharge. For example, "c3" means the third charge and "d10" means the tenth discharge.

FIG. 5 shows an increase in capacity due to repetition of charge and discharge. The discharge capacity of the power storage cell subjected to the aging treatment was 63 mAh/g.

Figure 6:
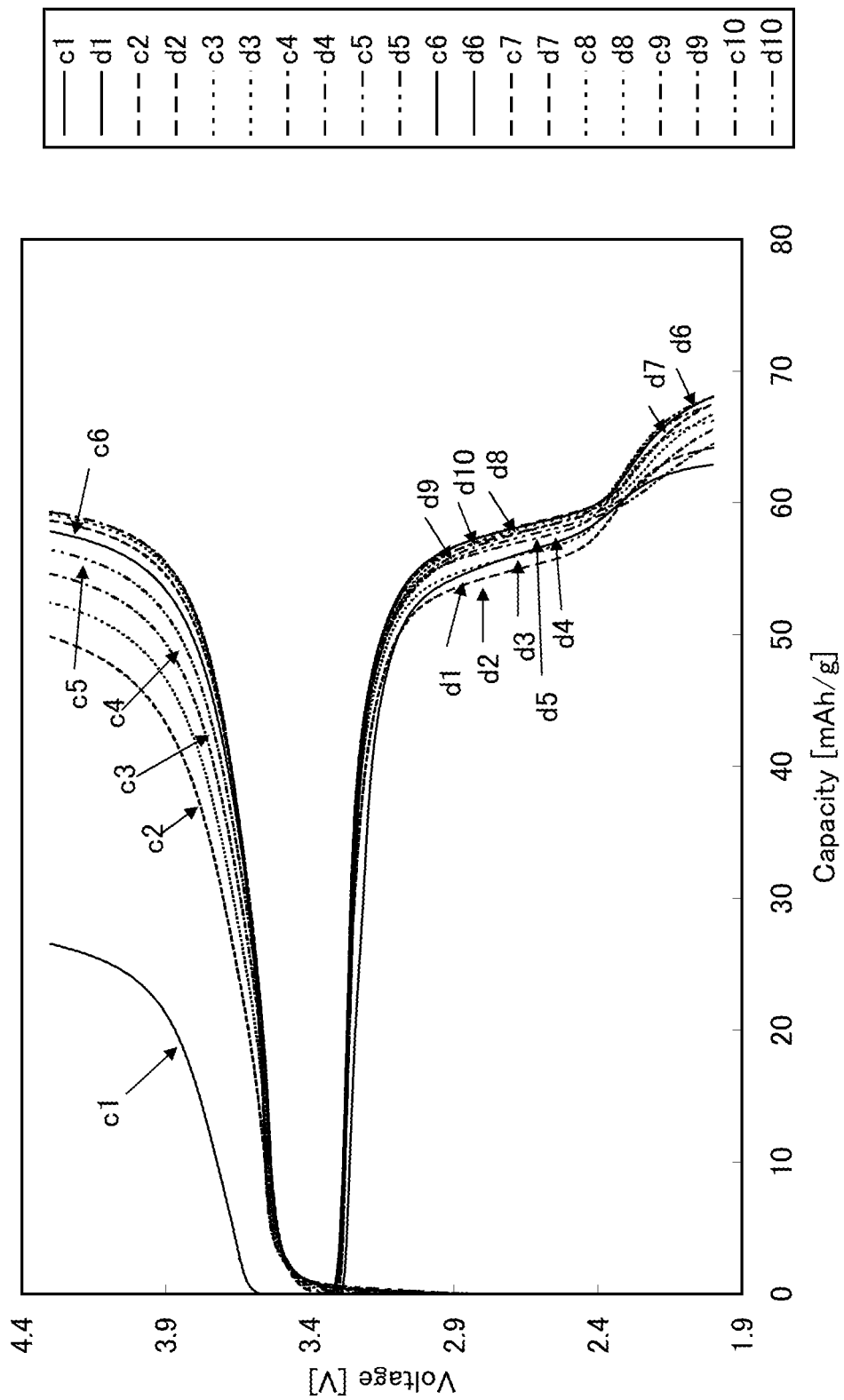
FIG. 6 is a graph showing the relation between capacity and voltage in the case of charging and discharging a power storage cell subjected to aging treatment.

FIG. 6 shows the relation between capacity and voltage in the case of performing each of charge and discharge at a constant current after the aging treatment. Charge and discharge were repeated 10 times at room temperature (25° C.) in FIG. 6 as in FIG. 5.

As shown in FIG. 6, the power storage cell subjected to the aging treatment was operated at room temperature (25° C.) and the discharge capacity thereof was almost equal to the maximum discharge capacity at the time of the aging treatment. FIG. 6 shows that the maximum discharge capacity was not decreased and was maintained even when charge and discharge were repeated after the aging treatment.

Figure 7:
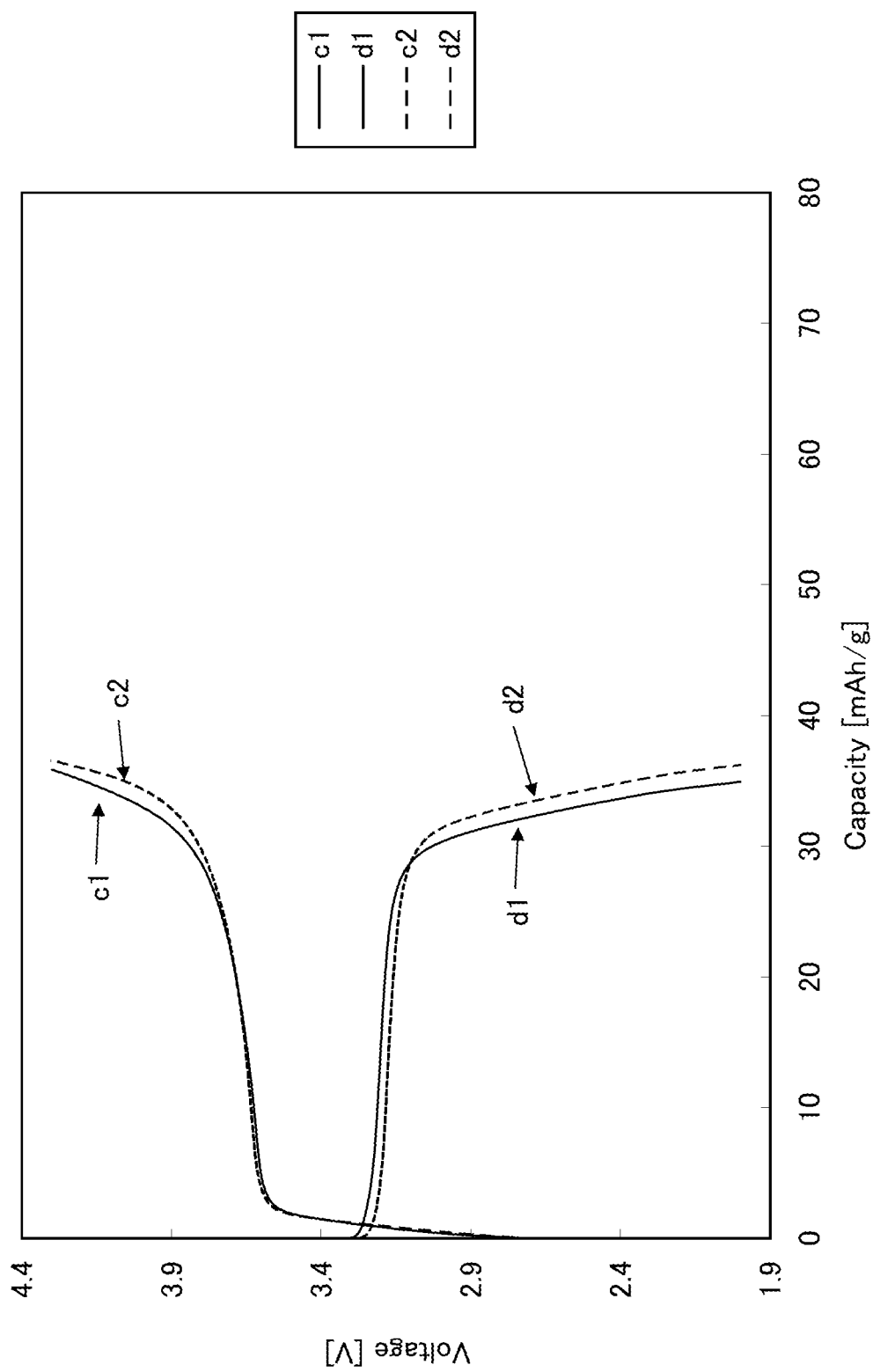
FIG. 7 is a graph showing the relation between capacity and voltage in the case of charging and discharging a power storage cell which is not subjected to aging treatment.

FIG. 7 shows the relation between capacity and voltage in the case where the power storage cell was not subjected to the aging treatment and was charged only at a constant current and discharged only at a constant current. Note that in FIG. 7, charge and discharge were repeated twice at room temperature (25° C.).

As shown in FIG. 7, when the aging treatment was not performed on the power storage cell, the maximum discharge capacity thereof was 37 mAh/g. Thus, the discharge capacity of the power storage cell which was not subjected to the aging treatment is lower than that of the power storage cell which was subjected to the aging treatment.

In this example, the electrolyte was sandwiched between the positive electrode and the negative electrode and then charge was performed at a constant current and a constant voltage and discharge was performed at a constant current, so that the power storage cell was manufactured. Thus, not only carrier ions in the active material layer which are likely to migrate (e.g., lithium ions) but also carrier ions in the active material layer which are less likely to migrate can be movable. Consequently, the discharge capacity of the power storage cell can be increased and the power storage cell can be operated at room temperature.

Further, resistance in charging and discharging of the power storage cell in this example is described with reference to FIG. 8 and FIG. 9.

Figure 8:
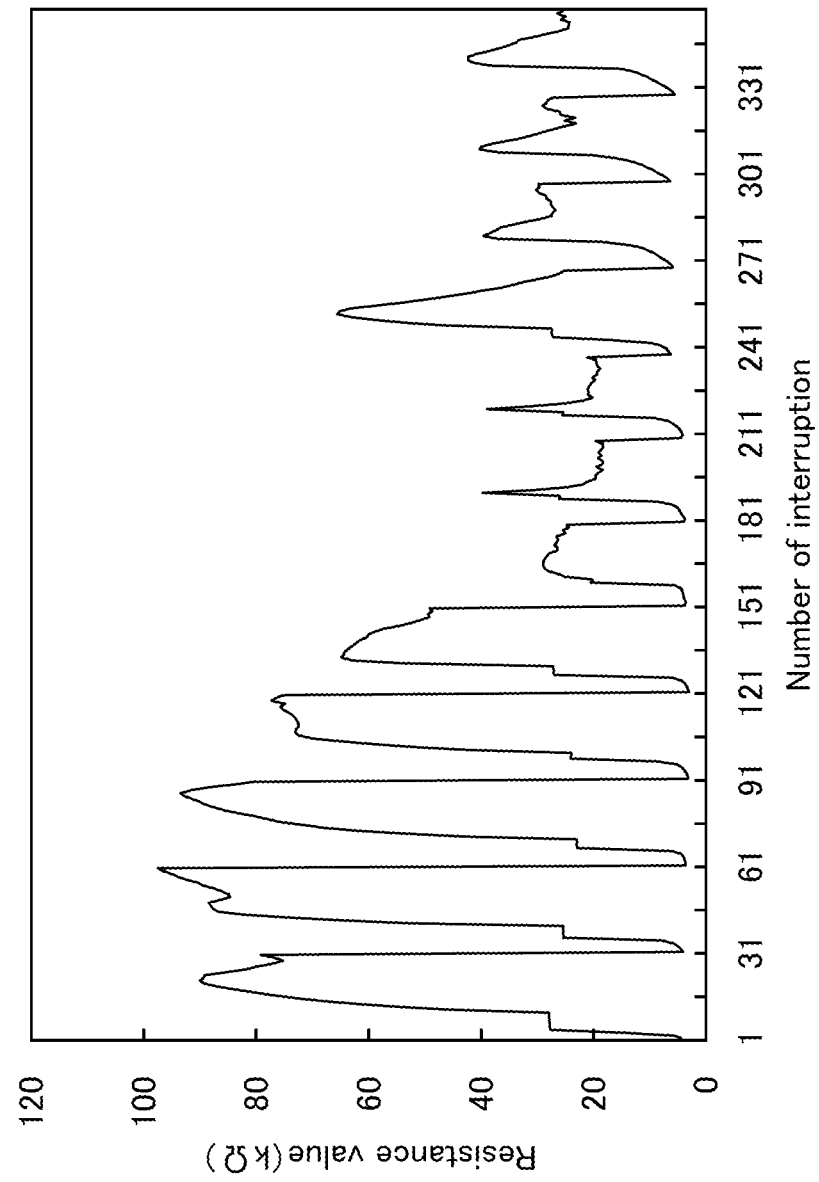
FIG. 8 is a graph showing resistance values of a power storage cell being charged.
Figure 9:
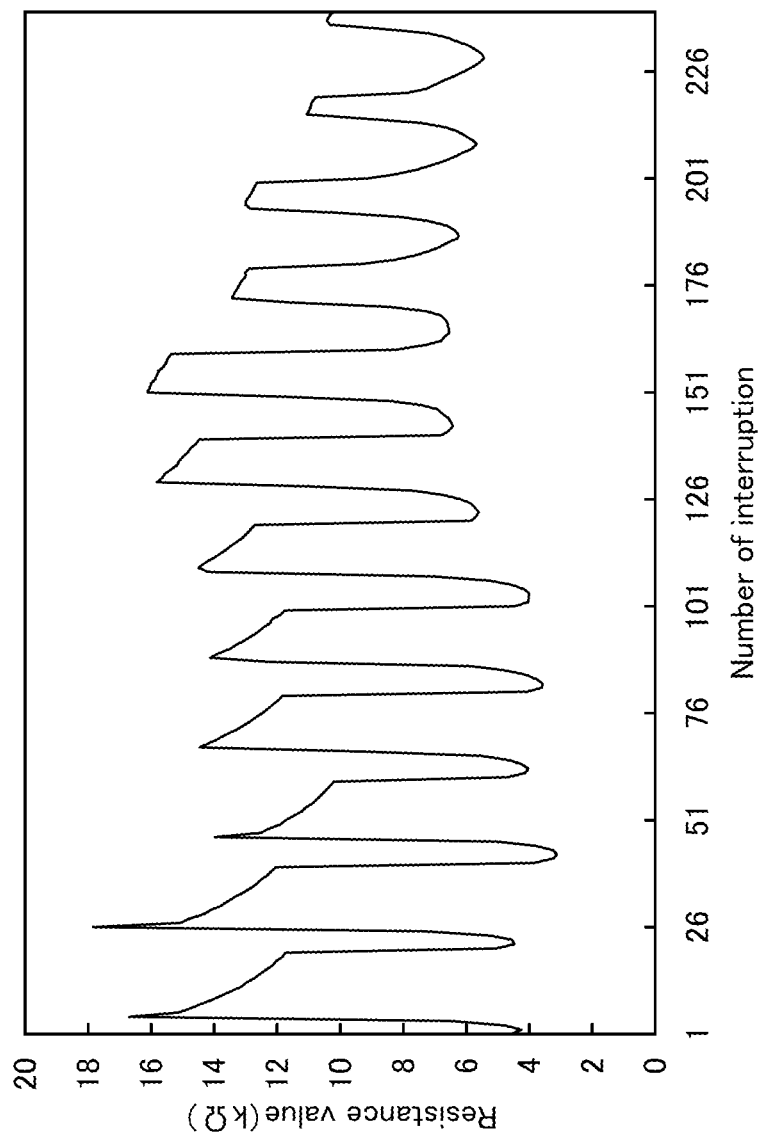
FIG. 9 is a graph showing resistance values of a power storage cell being discharged.

FIG. 8 shows measurement results of resistance in the case of performing and interrupting charge at a constant current and a constant voltage, and FIG. 9 shows measurement results of resistance in the case of performing and interrupting discharge at a constant current. In FIG. 8 and FIG. 9, the horizontal axis and the vertical axis indicate the number of interruptions and the resistance values of the power storage cell, respectively.

Note that in this specification, resistance was measured during a plural number of cycles. In each cycle, charge or discharge for a predetermined time and interruption of charge or discharge for a predetermined time are alternately repeated.

Resistance of the power storage cell was measured with a battery charge/discharge unit (HJ-SM8A) manufactured by HOKUTO DENKO CORPORATION. When resistance in the case of performing and interrupting charge was measured, 60-minute charge and 1-minute interruption were repeated 30 times, which is one cycle, and after a completion of one cycle, discharge was performed. Discharge was performed until accumulated electricity was lost in the power storage cell, and then the next cycle was started.

When the resistance in the case of performing and interrupting discharge was measured, 60-minute discharge and 1-minute interruption were repeated 20 times, which is one cycle, and after a completion of one cycle, charge was performed. Charge was performed until sufficient electricity was accumulated in the power storage cell, and then the next cycle was started.

In such a manner, resistance of the power storage cell, in the case of performing and interrupting charge and discharge was measured.

FIG. 8 shows that the resistance of the power storage cell is decreased due to repetition of charge at a constant current and a constant voltage. This is because, not only migration of carrier ions in the active material layer which are likely to migrate (e.g., lithium ions) but also migration of carrier ions in the active material layer which are less likely to migrate can be facilitated owing to the charge at a constant current and a constant voltage.

In the aforementioned manner, the power storage cell in this example can have higher discharge capacity and can operate at room temperature.

Example 2

In this example, charge and discharge characteristics of a power storage device manufactured with the use of materials different from those in Example 1 are described with reference to FIG. 13, FIG. 14, and FIG. 15.

As an electrolyte of a lithium ion secondary battery (power storage device) of this example, PEO, LiTFSI, and $Li_2O$ were used as an ion-conducting high molecular compound, a lithium electrolyte salt, and an inorganic oxide, respectively.

More specifically, 1 g of PEO, 0.33 g of LiTFSI, and 0.5 g of $Li_2O$ were weighed. Components of the secondary battery were similar to those in Example 1 except for the materials of the electrolyte; therefore, description of the method for manufacturing the secondary battery is not repeated.

In a manner similar to that in Example 1, the power storage cell was manufactured and then heated at 50° C.

Next, voltage was applied to the positive electrode and the negative electrode of the power storage cell to perform charge at a constant current and a constant voltage and discharge at a constant current (aging treatment) at room temperature (25° C.). When the aging treatment was performed, the power storage cell was charged at a current of 0.02 mA. After the voltage reached 4.2 V, the voltage was fixed at 4.2 V and the charge was continued. Further, the power storage cell was discharged at a current of 0.02 mA. Charge and discharge were repeated 10 times during the aging treatment. The relation between capacity and voltage in this case is shown in FIG. 13. Note that in FIG. 13, "c"

and "d" denote charge and discharge, respectively, and the numbers denote the number of charge and discharge, which are similar to those in Example 1. For example, "c3" means the third charge and "d10" means the tenth discharge.

Figure 13:
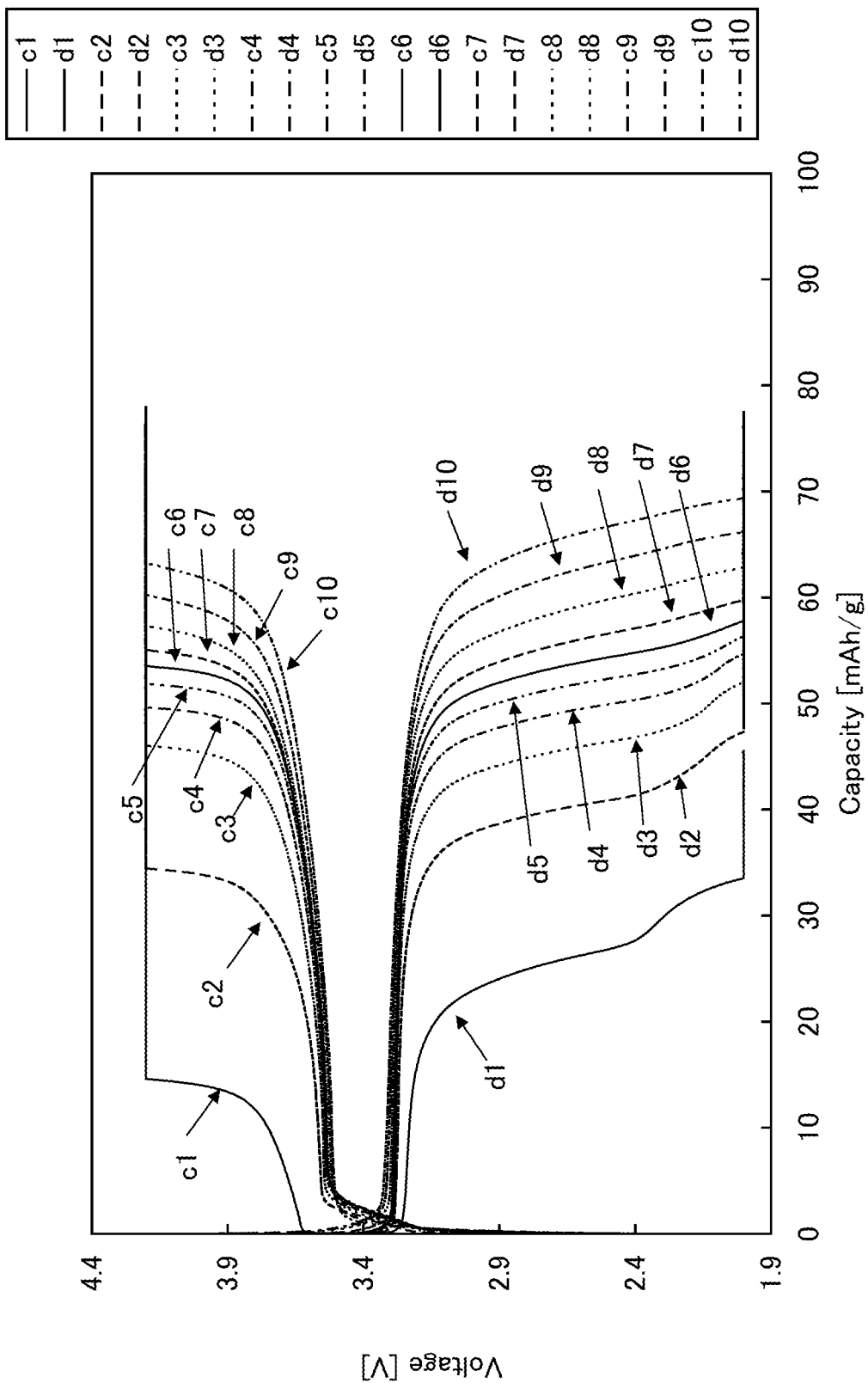
FIG. 13 is a graph showing the relation between capacity and voltage in the case of performing aging treatment.

FIG. 13 shows an increase in capacity due to repetition of charge and discharge. The maximum discharge capacity of the power storage cell subjected to the aging treatment was 69 mAh/g.

Figure 14:
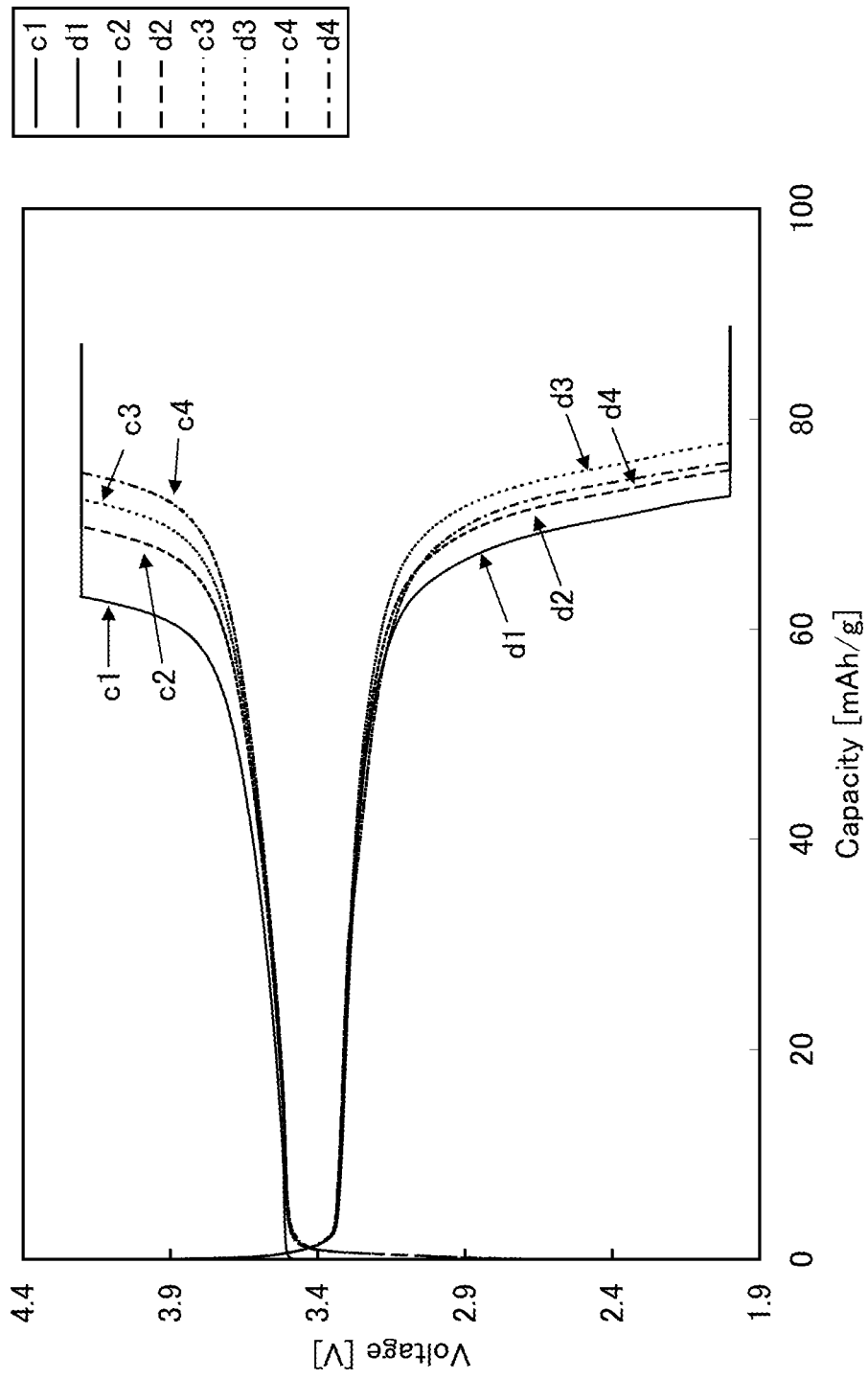
FIG. 14 is a graph showing the relation between capacity and voltage in the case of performing aging treatment.

FIG. 14 shows the relation between capacity and voltage in the case where aging treatment, during which charge at a constant current and a constant voltage and discharge at a constant current were repeated four times, was further performed after the aging treatment in FIG. 13 was completed.

FIG. 14 shows that the discharge capacity of the power storage cell subjected to the aging treatment was further increased. The maximum discharge capacity was obtained in the third discharge in FIG. 14 and the discharge capacity was 78 mAh/g.

Figure 15:
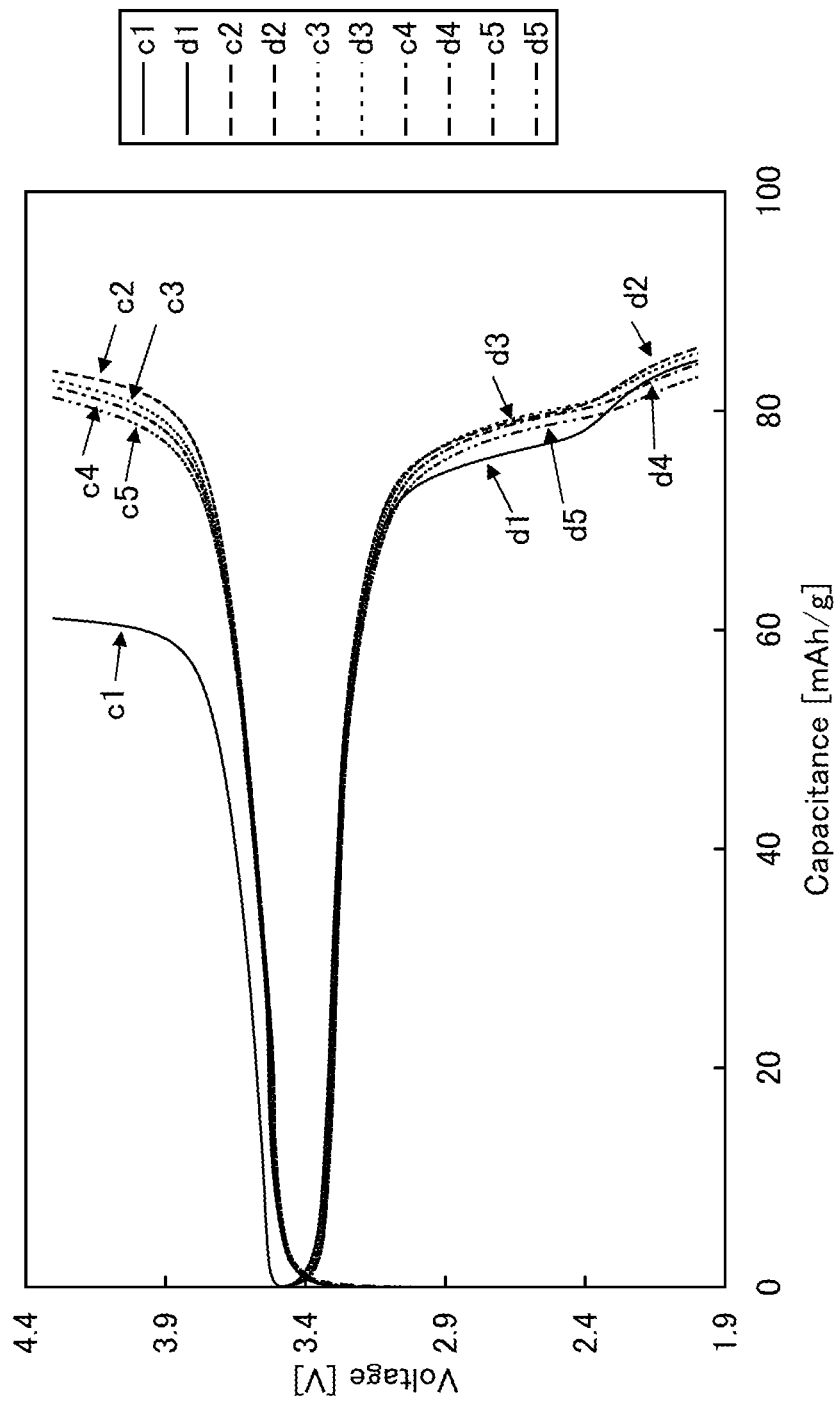
FIG. 15 is a graph showing the relation between capacity and voltage in the case of charging and discharging a power storage cell subjected to aging treatment.

FIG. 15 shows the relation between capacity and voltage in the case of performing each of charge and discharge at a constant current after the aging treatments shown in FIGS. 13 and 14. Note that in FIG. 15, charge and discharge were repeated 5 times at room temperature (25° C.).

FIG. 15 shows that the discharge capacity of the power storage cell subjected to the aging treatment and then discharged at a constant current was further increased. The maximum discharge capacity was obtained in the second discharge in FIG. 15 and the discharge capacity was 86 mAh/g.

As described above, the discharge capacity in this example is higher than that in Example 1. Moreover, the discharge capacity increases as the number of aging treatments increases.

An increase in conductivity of lithium ions due to the aging treatment is one of the reasons why the discharge capacity was increased in this example. With the aging treatment, due to PEO and oxygen atoms on a surface of powder of the inorganic oxide ($Li_2O$), migration of anions except for lithium ions is suppressed, so that migration of lithium ions is facilitated. Thus, the conductivity of lithium ions is increased and the discharge capacity of the power storage cell is increased.

This application is based on Japanese Patent Application serial No. 2011-068585 filed with Japan Patent Office on Mar. 25, 2011 and Japanese Patent Application serial No. 2011-118807 filed with Japan Patent Office on May 27, 2011, the entire contents of which are hereby incorporated by reference.

What is claimed is:

1. A method for operating a power storage device, comprising the steps of:
forming a stacked structure by providing an electrolyte between a positive electrode and a negative electrode, the electrolyte consisting of an ion-conducting high molecular compound, an inorganic oxide, and a lithium electrolyte salt;
performing a first charge at a first current value between the positive electrode and the negative electrode;
performing a second charge at a first voltage value between the positive electrode and the negative electrode after the first charge; and
performing a discharge from the stacked structure at a second current value after the second charge,
wherein the inorganic oxide is a compound represented by $Li_2O$.

2. The method according to claim 1, wherein the first charge, the second charge and the discharge are performed at a room temperature.

3. The method according to claim 1, wherein the steps of the first charge, the second charge and the discharge are repeated more than once.

4. The method according to claim 1, wherein the electrolyte is a solid electrolyte.

5. A method for manufacturing a power storage device, comprising the steps of:
forming a stacked structure by providing a solid electrolyte between a positive electrode and a negative electrode, the solid electrolyte consisting of an ion-conducting high molecular compound, powder of a compound $Li_2O$, and a lithium electrolyte salt;
performing a first charge at a first current value between the positive electrode and the negative electrode;
performing a second charge at a first voltage value between the positive electrode and the negative electrode after the first charge; and
performing a discharge from the stacked structure at a second current value after the second charge.

6. The method according to claim 5, wherein the first charge, the second charge and the discharge are performed at a room temperature.

7. The method according to claim 5, wherein the steps of the first charge, the second charge and the discharge are repeated more than once.

8. The method according to claim 5, wherein the ion-conducting high molecular compound is polyalkylene oxide.

9. The method according to claim 5, wherein the lithium electrolyte salt is one or more of $LiN(SO_2CF_3)_2$, $LiN(SO_2C_2F_5)_2$, $LiCF_3SO_3$, $LiPF_6$, $LiBF_4$, $LiClO_4$, and $LiSCN$.

10. The method according to claim 5, wherein a diameter of the powder is greater than or equal to 50 nm and less than or equal to 10 μm.

11. A method for manufacturing a power storage device, comprising the steps of:
forming a stacked structure by providing a solid electrolyte between a positive electrode and a negative electrode, wherein the solid electrolyte is formed by mixing an ion-conducting high molecular compound, powder of $Li_2O$, and a lithium electrolyte salt;
performing a first charge at a first current value between the positive electrode and the negative electrode;
performing a second charge at a first voltage value between the positive electrode and the negative electrode after the first charge; and
performing a discharge from the stacked structure at a second current value after the second charge,
wherein the solid electrolyte consists of the ion-conducting high molecular compound, powder of $Li_2O$, and the lithium electrolyte salt.

12. The method according to claim 11, wherein the first charge, the second charge and the discharge are performed at a room temperature.

13. The method according to claim 11, wherein the steps of the first charge, the second charge and the discharge are repeated more than once.

14. The method according to claim 11, wherein the ion-conducting high molecular compound is polyalkylene oxide.

15. The method according to claim 11, wherein the lithium electrolyte salt is one or more of $LiN(SO_2CF_3)_2$, $LiN(SO_2C_2F_5)_2$, $LiCF_3SO_3$, $LiPF_6$, $LiBF_4$, $LiClO_4$, and $LiSCN$.

16. The method according to claim 11, wherein a diameter of the powder is greater than or equal to 50 nm and less than or equal to 10 μm.

\* \* \* \* \*